United States Patent
Arima

(10) Patent No.: US 8,203,761 B2
(45) Date of Patent: Jun. 19, 2012

(54) IMAGE READING APPARATUS AND CONTROL METHOD WITH STREAK DETECTION AND CORRECTION USING STRING COUNT AND CONTINUITY DETECTION

(75) Inventor: Makoto Arima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 12/399,232

(22) Filed: Mar. 6, 2009

(65) Prior Publication Data
US 2009/0244657 A1 Oct. 1, 2009

(30) Foreign Application Priority Data

Mar. 25, 2008 (JP) ................. 2008-079217

(51) Int. Cl.
*H04N 1/409* (2006.01)
*H04N 1/192* (2006.01)
(52) U.S. Cl. ............... 358/3.26; 358/463; 358/496
(58) Field of Classification Search ............. None
See application file for complete search history.

(56) References Cited

U.S. PATENT DOCUMENTS

| 7,889,393 | B2 * | 2/2011 | Yoshizawa | 358/3.26 |
| 2006/0061830 | A1 * | 3/2006 | Sakakibara | 358/474 |
| 2008/0278597 | A1 | 11/2008 | Arima | 348/222.1 |
| 2009/0316222 | A1 * | 12/2009 | Oshida et al. | 358/474 |

FOREIGN PATENT DOCUMENTS

JP 2005-117090 4/2005

* cited by examiner

*Primary Examiner* — Scott A Rogers
(74) *Attorney, Agent, or Firm* — Fitzpatrick, Cella, Harper & Scinto

(57) ABSTRACT

When an auto document feeder feeds an original to an original image reading platen, a CCD line sensor reads the original along the main scanning direction perpendicular to the feeding direction of the original. A string detection circuit detects a streak parallel to the feeding direction in the image. A string correction circuit corrects the detected streak. In particular, for a predetermined number of sub-scanning positions that are located in the same main scanning position as the main scanning position at which the streak has been detected by the string detection circuit and that exist subsequent to the sub-scanning position at which the streak has been detected, correction is performed by the string correction circuit even when no streak is detected by the string detection circuit.

13 Claims, 14 Drawing Sheets

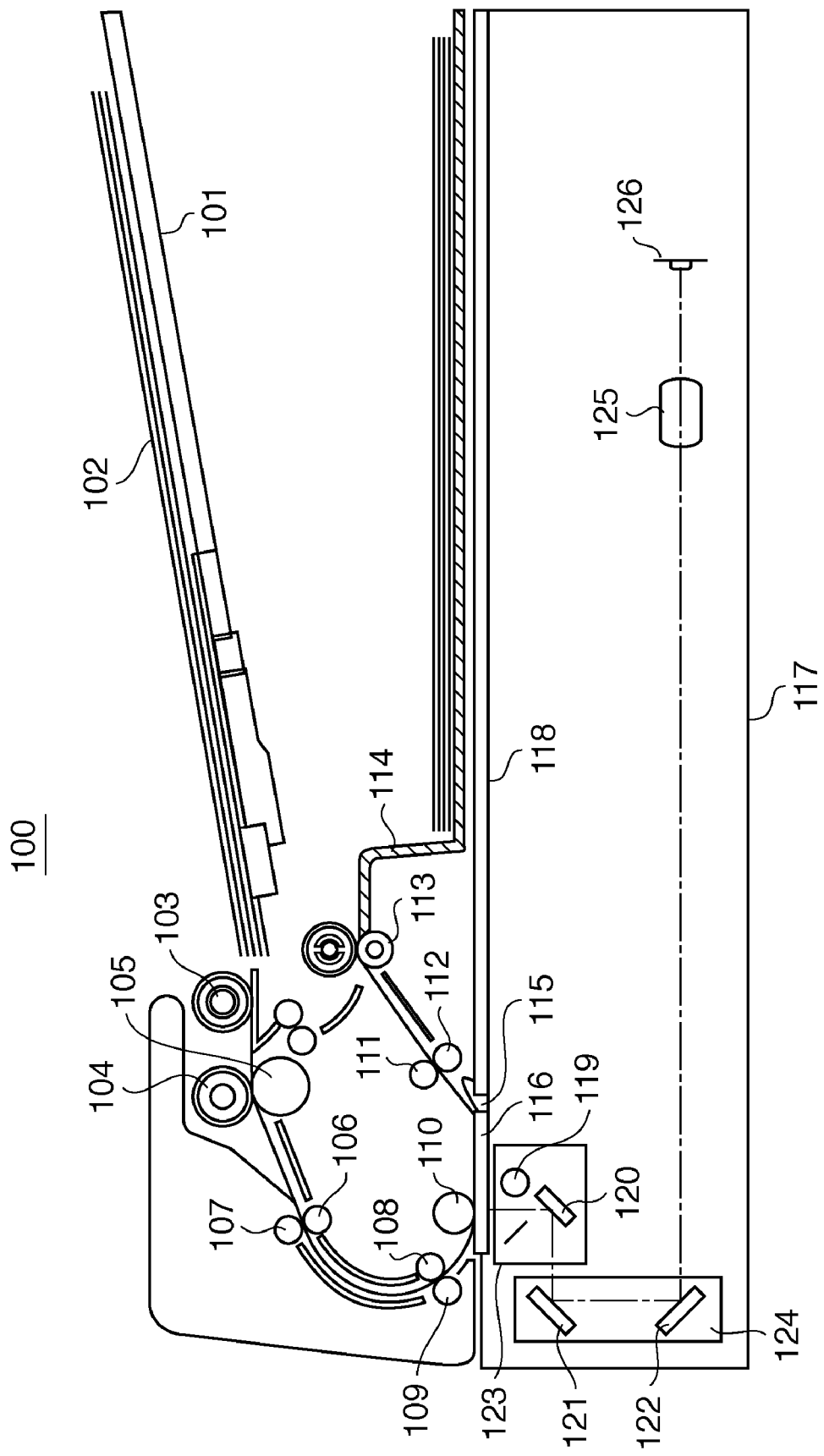

READING POSITION (FIXED) IN
DOCUMENT FEEDING AND READING MODE.

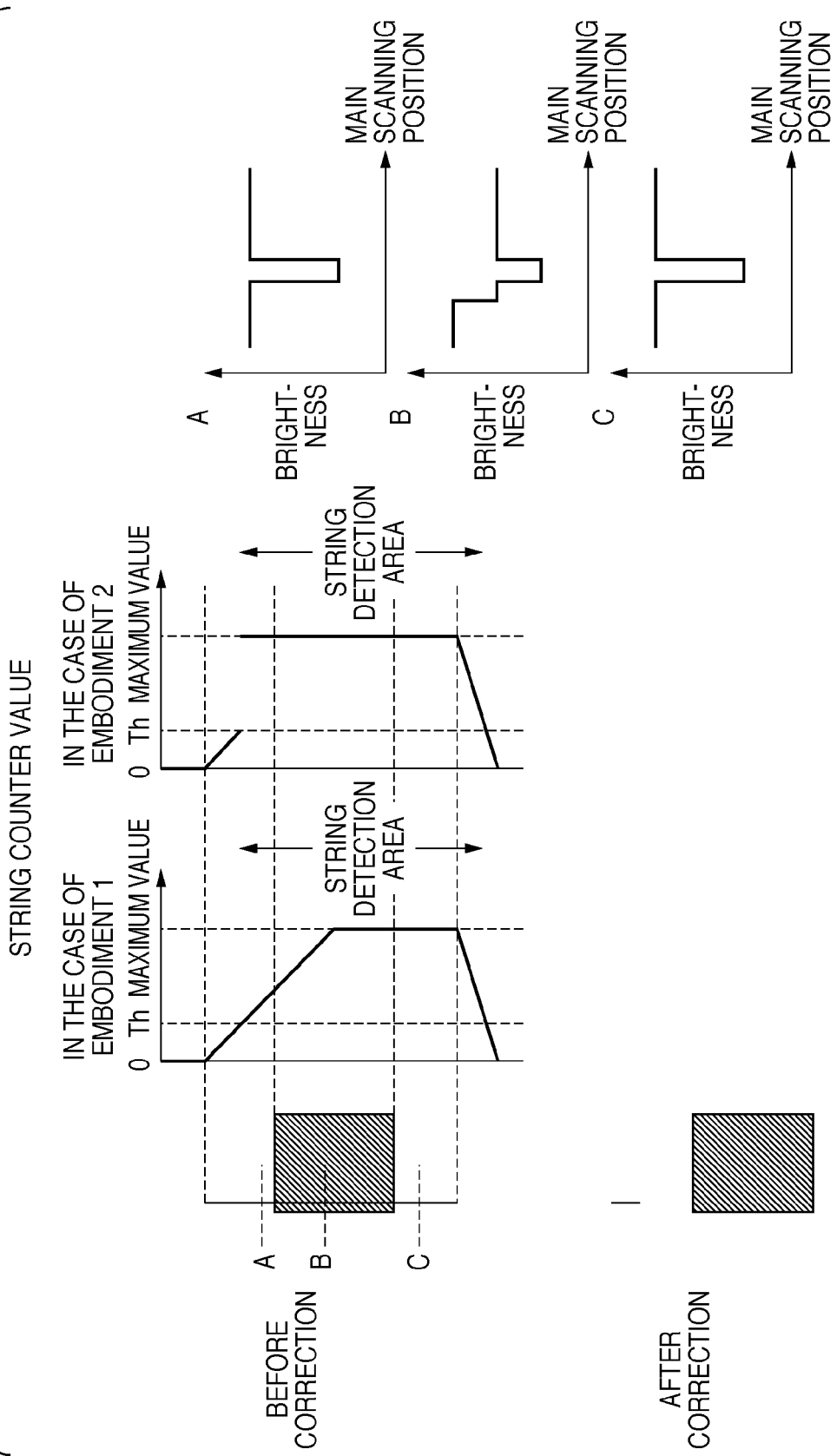

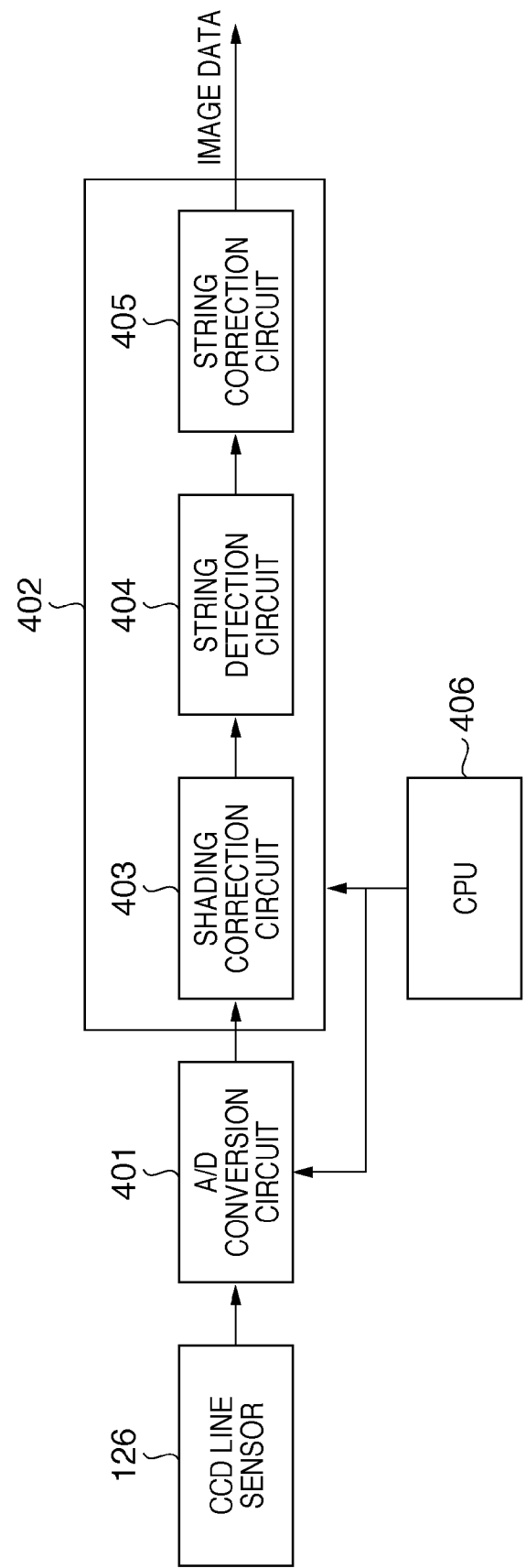

FIG. 6A
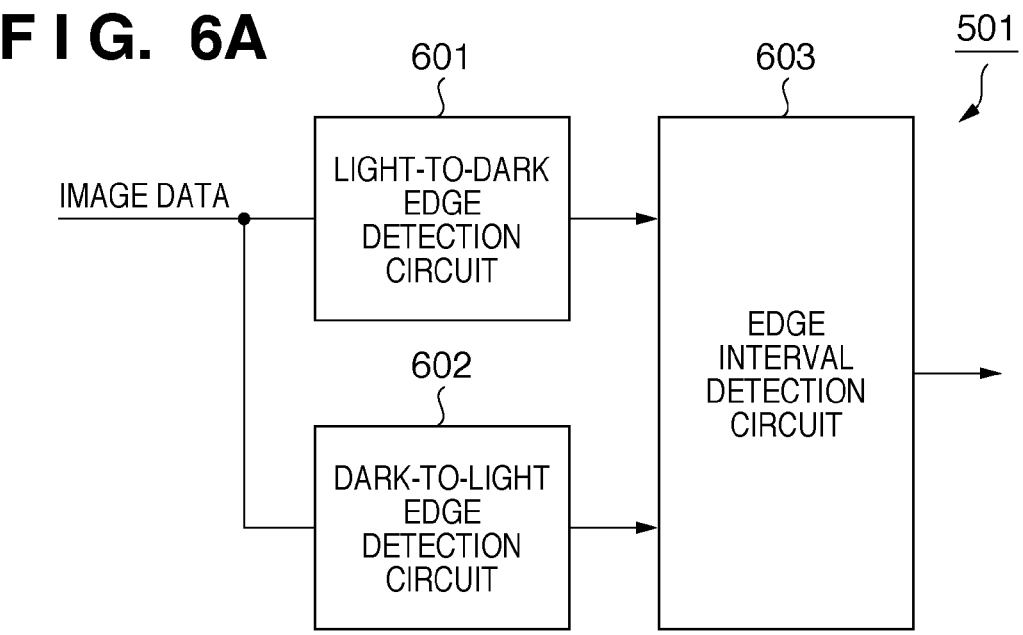
FIG. 6B
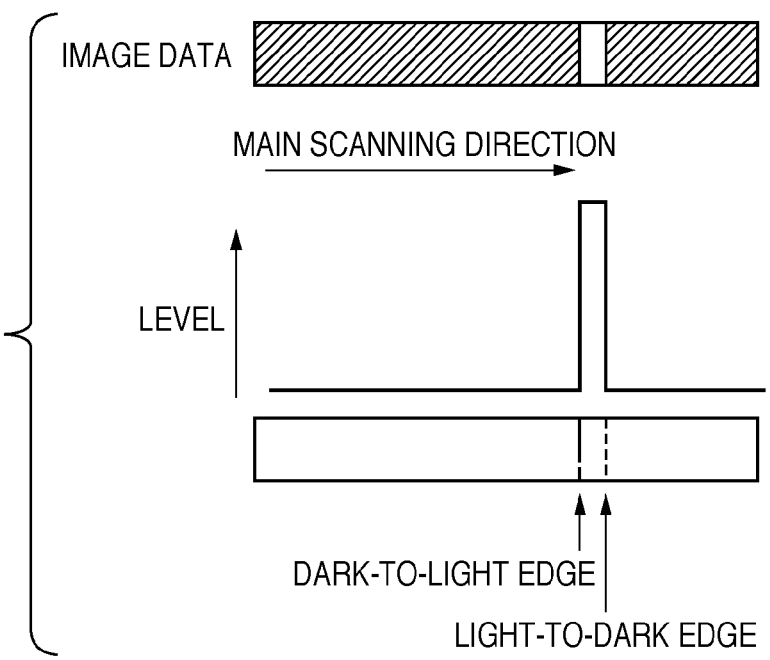
FIG. 6C

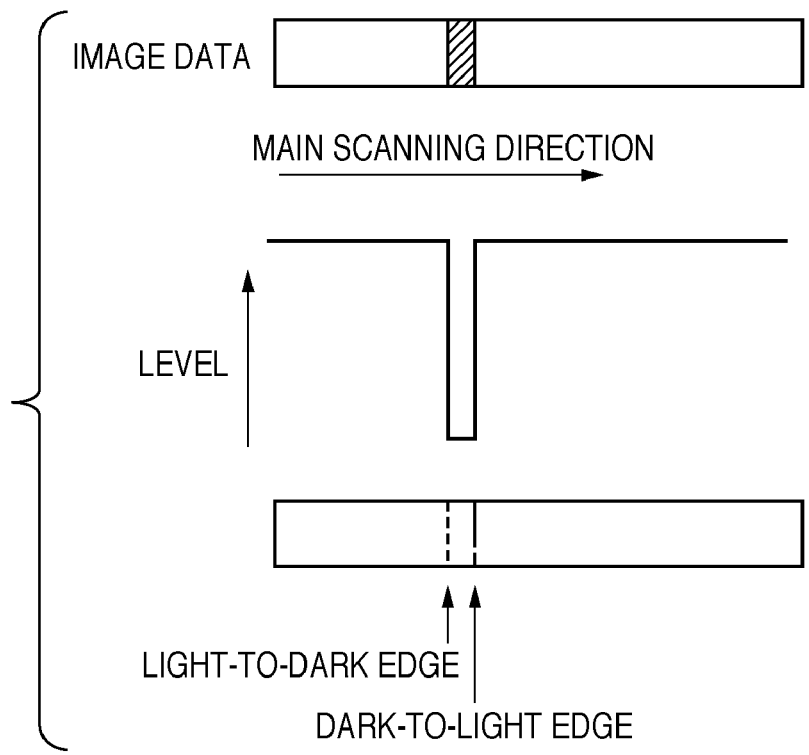

IMAGE READING APPARATUS AND CONTROL METHOD WITH STREAK DETECTION AND CORRECTION USING STRING COUNT AND CONTINUITY DETECTION

BACKGROUND OF THE INVENTION

1. Field of the Invention

The present invention relates to an image reading apparatus that reads image information recorded on an original and control method thereof.

2. Description of the Related Art

Some conventionally known image reading apparatuses that are used in copiers and the like perform what is called "reading while feeding". In such an apparatus, the auto document feeder conveys an original sheet by sheet onto the platen glass. The image sensor, such as a CMOS or CCD, reads original images while the exposing unit emits light onto the original on the platen glass.

However, if a piece of dust is attached to the image reading position of the platen glass, a defect image in the form of a string (streak) may occur in the read images. The term, "streak" refers to an image that occurs in the same main scanning position in a read image, and thus is different from string-shaped thin lines that originally exist in an original. Herein, such a streak resulting from a piece of dust is referred to as a "dust image". The dust image can appear in the form of a white string or a black string, depending on the background of the original.

An invention is known that detects a dust image from images in a read page (Japanese Patent Laid-Open No. 2005-117090). Specifically, an image in which a predetermined number of sequential pixels that have no correlation with (have a large difference in brightness from) adjacent pixels in the main scanning direction exist in the sub-scanning direction is determined as a dust image.

However, according to the invention disclosed in Japanese Patent Laid-Open No. 2005-117090, if a situation occurs in which a dust image extending in the sub-scanning direction and an original image extending in the main scanning direction intersect each other, because there is a correlation (a small difference in brightness) between a pixel of interest and adjacent pixels located in the main scanning direction (the difference in brightness is small), an erroneous determination may be made that the dust image has disappeared in the sub-scanning position.

FIG. 11 shows an example of dust image detection according to the related art. In a diagram 1101, a dust image 3001 has occurred in a read original image. Note that the dust image 3001 is overlaid on a character 3002. A diagram 1102 shows the brightness of a sub-scanning position A. It can be seen from the diagram 1102 that the brightness of a main scanning position that corresponds to the dust image 3001 is decreased relative to that of the periphery. That is, there is a pixel that has no correlation with adjacent pixels in the main scanning direction. An image in which a predetermined number of such pixels that have no correlation with adjacent pixels exist sequentially in the sub-scanning direction is determined as a dust image. A diagram 1103 shows the brightness of a sub-scanning position B. It can be seen from the diagram 1103 that the brightness of a main scanning position that corresponds to the dust image 3001 decreases slightly relative to that of the periphery. However, because the character 3002 exists, the brightness of the peripheral main scanning positions also decreases. That is, because there is a correlation between a pixel of interest and adjacent pixels located in the main scanning direction, an erroneous determination may be made that the dust image has disappeared in the sub-scanning position B. A diagram 1104 shows the brightness of a sub-scanning position C. It can be seen from the diagram 1104 that the brightness of a main scanning position that corresponds to the dust image 3001 decreases relative to that of the periphery, indicating that a pixel that has no correlation with adjacent pixels located in the main scanning direction has appeared again.

A diagram 1105 shows an example of a method for correcting a dust image according to the related art. According to the related art, a dust image 3001 is detected based on the continuity of the dust image, and a dust image that extends from the detected dust image is corrected with peripheral pixels. Accordingly, in the case where a dust image is overlaid on a character 3002 or a horizontal ruled line in an original, an erroneous determination may be made that the dust image has disappeared, and dust image correction may not be performed until another continuous dust image is detected. In this case, as shown in the diagram 1105, short dust images 3003 that were not corrected remain in the resulting image at portions where the dust image intersects with the character or horizontal ruled line. Therefore, this method is not preferable.

SUMMARY OF THE INVENTION

In view of the above, it is an object of the present invention to solve at least one of the above-described problems and other problems. For example, the present invention is intended to improve the accuracy of dust image correction. Other problems will be understood through the entire specification.

The present invention is applicable to an image reading apparatus. When a feeding unit feeds an original to an original image reading platen, a reading unit reads the original along the main scanning direction perpendicular to the feeding direction of the original. A detecting unit detects a streak parallel to the feeding direction in the image read by the reading unit. A correcting unit corrects the streak detected by the detecting unit. In particular, for a predetermined number of sub-scanning positions that are located in a main scanning position at which the streak has been detected by the detecting unit and that exist subsequent to a sub-scanning position at which the streak has been detected, correction is performed by the correcting unit even when no streak is detected by the detecting unit.

Further features of the present invention will become apparent from the following description of exemplary embodiments with reference to the attached drawings.

BRIEF DESCRIPTION OF THE DRAWINGS

FIG. 1 is a schematic cross-sectional view of an image reading apparatus on which an automatic original-conveying apparatus is mounted according to an embodiment of the present invention.

FIG. 3B shows an example of a method for detecting a dust image and a method for correcting the same according to an embodiment of the present invention.

FIG. 4 is a block diagram of an image reading apparatus according to an embodiment of the present invention.

FIG. 6A is a diagram showing an example of a thin line detection circuit 501 according to an embodiment of the present invention.

FIG. 6B is a diagram showing an example of a filter for detecting a light-to-dark edge according to an embodiment of the present invention.

FIG. 6C is a diagram showing an example of image data when a thin white line has been detected and the corresponding pixel level.

FIG. 6D is a diagram showing an example of image data when a thin black line has been detected and the corresponding pixel level.

FIG. 6E is a diagram showing an example of a vertical line detection filter.

DESCRIPTION OF THE EMBODIMENTS

Figure 2A:
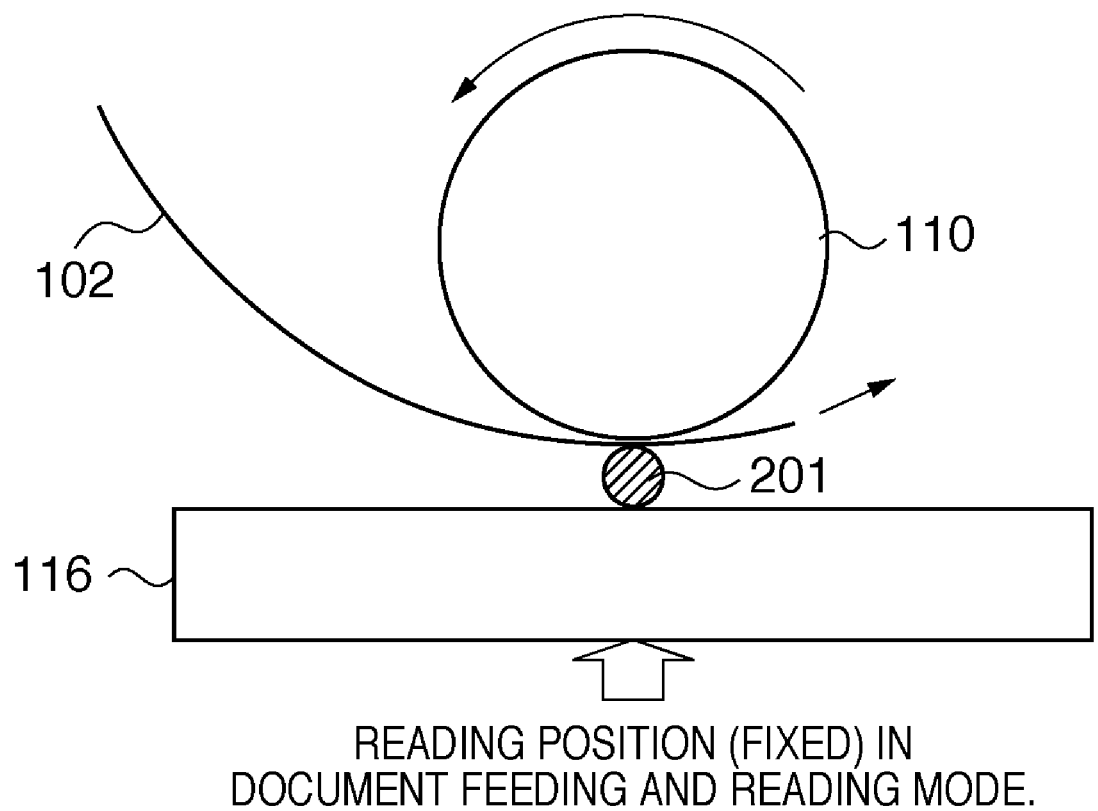
FIG. 2A is a diagram used to illustrate the influence of a speck in a flowing document reading mode.

Hereinafter, embodiments of the present invention will be described. The individual embodiments described below are useful in understanding various concepts of the present invention such as the generic concept, specific concept, and more specific concept. It should be understood that the technical scope of the present invention is defined by the appended claims, and is not limited by the individual embodiments described below.

Embodiment 1

FIG. 1 is a schematic cross-sectional view of an image reading apparatus on which an automatic original-conveying apparatus is mounted according to the present embodiment. An auto document feeder 100 feeds an original 102 placed on an original tray 101 with a paper-feed roller 103 and a separating and conveying roller 104. The auto document feeder 100 is an example of a feeding unit which feeds an original to an image reading platen.

A separating and conveying driven roller 105 is disposed opposite to the separating and conveying roller 104, and is pressed against the separating and conveying roller 104. The separating and conveying driven roller 105, in cooperation with the separating and conveying roller 104, separates and feeds the original 102 fed by the paper-feed roller 103 sheet by sheet.

A registration roller 106 and a registration driven roller 107 are provided to align the leading edge of the fed original. A lead roller 108 and a lead driven roller 109 convey the original to a reading-while-feeding glass 116. The reading-while-feeding glass 116 is an example of an image reading platen. A platen roller 110 is disposed opposite to the reading-while-feeding glass 116.

A CCD line sensor 126 reads image information on the original 102 passing over the reading-while-feeding glass 116. The CCD line sensor 126 is an example of a reading unit which reads an original line by line or in multiple lines thereof along the main scanning direction that is perpendicular to the feeding direction of the original.

When the CCD line sensor 126 finishes reading the image on the original 102, a lead discharge roller 111 and a lead discharge driven roller 112 convey the original to a paper discharge roller 113. A jump base 115 is provided to pick up the original from the reading-while-feeding glass 116. The paper discharge roller 113 discharges the original to a paper discharge tray 114.

An image reading apparatus 117 includes a lamp 119 for emitting light onto a side of the original to be read, and mirrors 120, 121 and 122. The auto document feeder 100 can be regarded as part of the image reading apparatus 117.

The mirrors 120, 121 and 122 guide light reflected off the original 102 to a lens 125 and the CCD line sensor 126. The lamp 119 and the mirror 120 are attached to a first mirror base 123. The mirrors 121 and 122 are attached to a second mirror base 124.

The first mirror base 123 and the second mirror base 124 are connected to a drive motor (not shown) with wires (not shown), and are moved parallel to a platen glass 118 as a result of the rotation of the drive motor. The light reflected off of the original is guided to the lens 125 via the mirrors 120, 121 and 122, and is collected by the lens 125 to form an image on a light-receiving unit of the CCD line sensor 126. The CCD line sensor 126 converts the reflected light forming the image into an electric signal with a light-receiving element, and outputs the electric signal according to the amount of received light.

The image reading apparatus 117 has a fixed document reading mode, and a flowing document reading mode. The fixed document reading mode is a mode in which an original 102 placed on the platen glass 118 is read by moving the first mirror base 123 and the second mirror base 124. The flowing document reading mode is a mode in which the first mirror base 123 and the second mirror base 124 reads, without moving, an original 102 being conveyed by the auto document feeder 100 at the image reading position of the reading-while-feeding glass 116. In other words, in the fixed document reading mode, the original 102 remains still while being read, whereas in the flowing document reading mode, the original 102 is moved while being read. Accordingly, in the flowing document reading mode, a situation occurs in which a defect image in the form of a string (streak or dust image) occurs due to a speck attached to the image reading position.

FIG. 2A is a diagram illustrating the influence of a speck in the flowing document reading mode. A situation can occur in which a speck 201 such as a piece of dust is attached to the image reading position of the reading-while-feeding glass 116. In this case, the speck 201 is read together with the image of the original.

In the case where a light original is read, the pixel level of a main scanning position corresponding to the piece of dust will be lower than that of the periphery. That is, a black dust image appears in the resulting image. In contrast, in the case where a dark original is read, the pixel level of the main scanning position corresponding to the piece of dust will be higher than that of the periphery. That is, a white dust image appears in the resulting image.

Figure 2B:
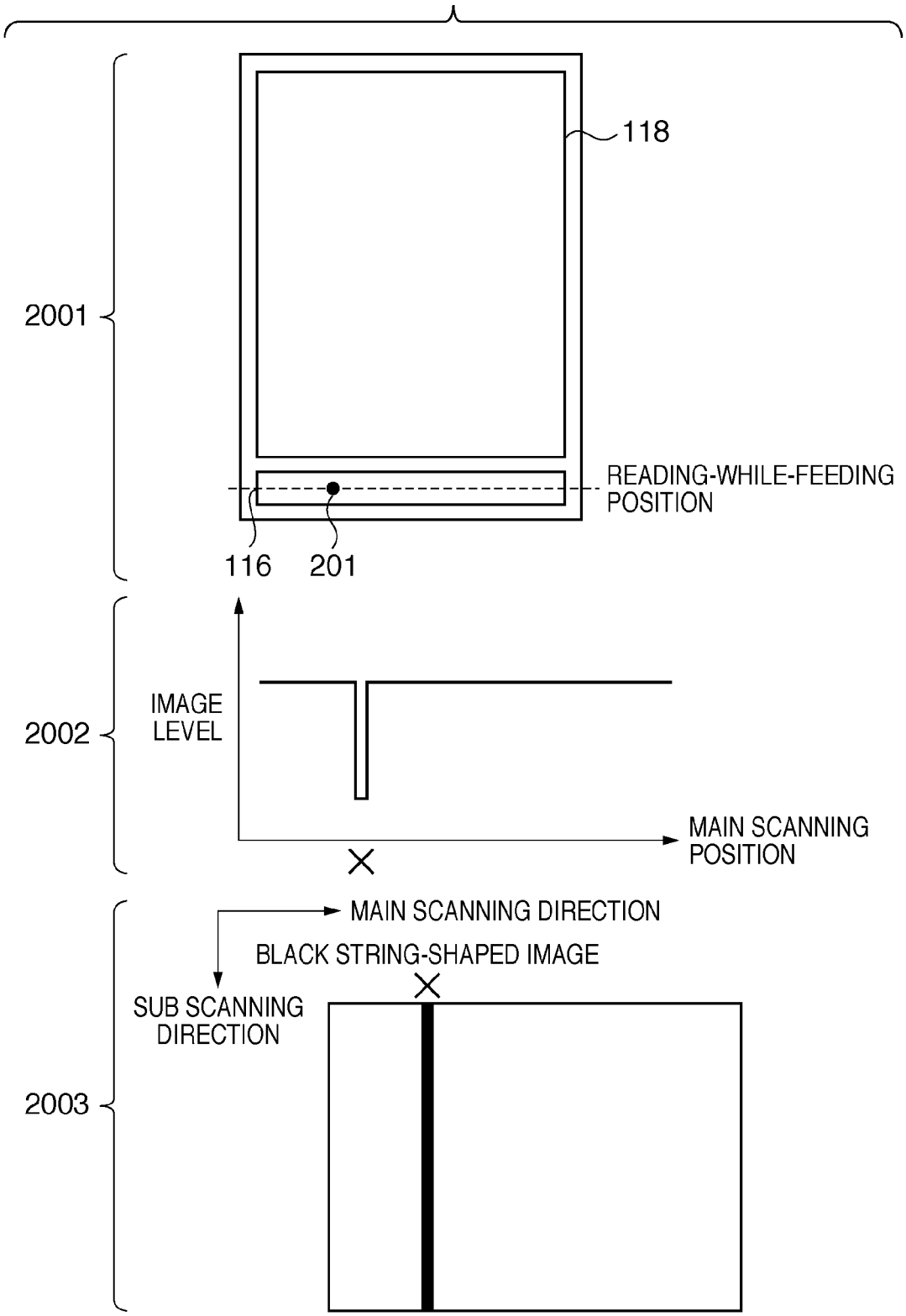
FIG. 2B shows an example of an image reading face of an image reading apparatus, an image level resulting from a speck, and an image in which a dust image has appeared.

FIG. 2B shows an example of an image reading face of the image reading apparatus, an image level resulting from a speck, and an image in which a dust image has appeared. Specifically, referring to the diagram 2001, the image reading position (reading-while-feeding position) exists in substantially the center of the reading-while-feeding glass 116. A speck 201 is attached to the linear image reading position. A main scanning position corresponding to the attached position of the speck 201 is referred to as main scanning position X.

A diagram 2002 of FIG. 2B shows the decrease in image level resulting from the speck. The horizontal axis represents the main scanning position, and the vertical axis represents the image level (pixel value). It is clear from the diagram 2002 that the image level decreases in the main scanning position X corresponding to the attached position of the speck 201.

A diagram 2003 of FIG. 2B shows an example of an image in which a dust image has appeared. A dust image occurs in the same main scanning position as a piece of dust attached to the reading position of the image reading platen as a result of the reading unit reading the piece of dust. In the diagram 2003, a dust image is formed in the main scanning position X corresponding to the attached position of the speck 201. Since the feeding direction of the original is parallel to the sub-scanning direction, the dust image extends in the sub-scanning direction.

Figure 3A:
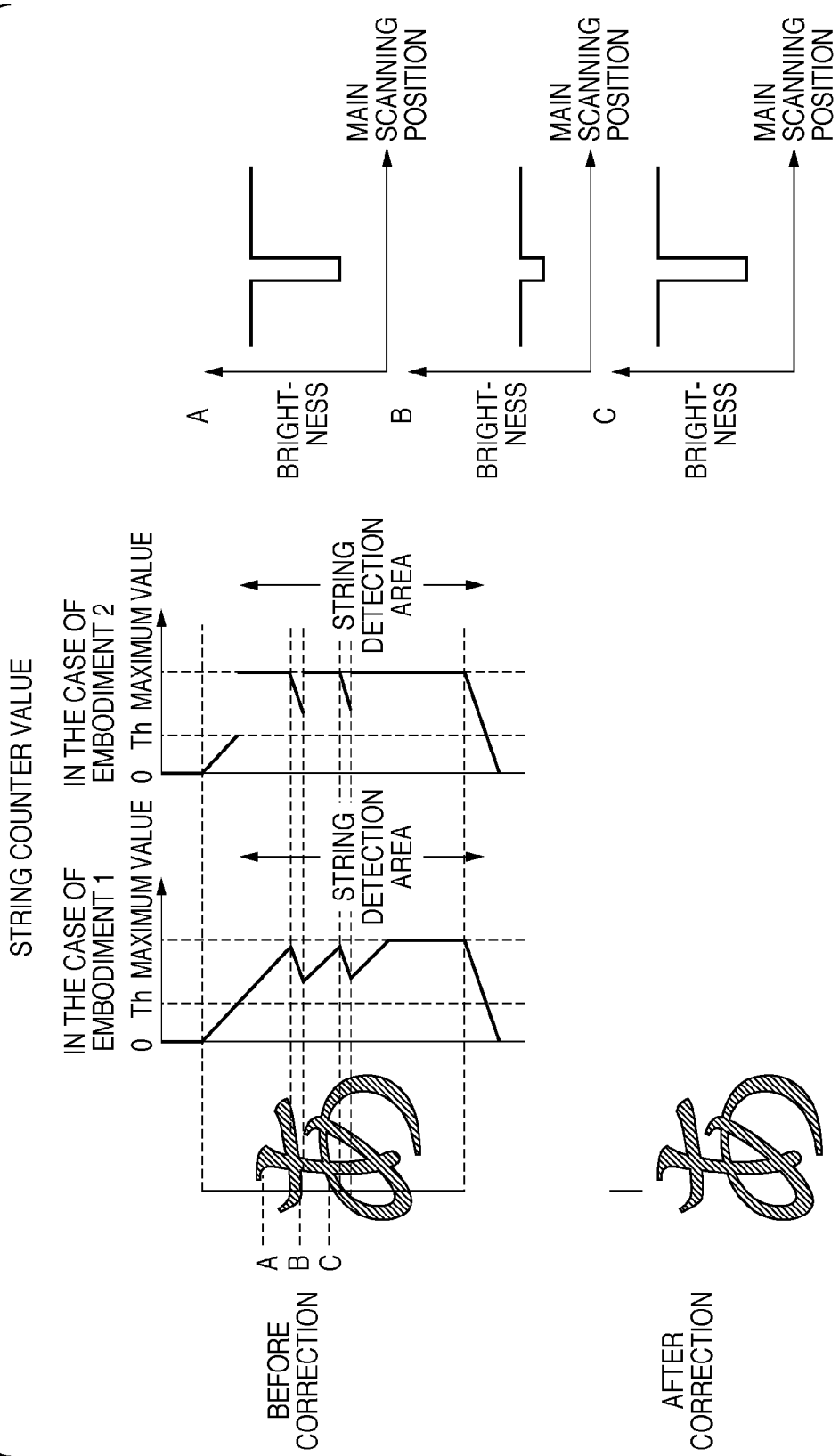
FIG. 3A shows an example of a method for detecting a dust image and a method for correcting the same according to an embodiment of the present invention.

FIGS. 3A and 3B show an example of a method for detecting a dust image and a method for correcting the same according to the present embodiment. According to the present embodiment, a terminal pixel that forms the end of a dust image is specified according to the pixel value of at least one peripheral pixel located in the periphery of a pixel of interest. It should be noted that the terminal pixel is not the real end of the dust image, but a pixel that has been determined as the end by a detection algorithm. Next, a predetermined number of pixels that belong to the same main scanning position as the main scanning position of the terminal pixel and that extend from the terminal pixel in the sub-scanning direction are also regarded as part of the dust image and are added as targets of correction. According to conventional technology, when an object (character, drawing, etc.) that crosses a dust image exists in an original, dust image detection or correction stops, and as a result, part of the dust image remains in the resulting image. According to the present embodiment, however, even when the end of a dust image has been detected, correction continues, so that it is possible to ensure that part of a dust image does not remain in a position where the dust image and an object intersect each other.

According to the embodiment shown in FIGS. 3A and 3B, a counter is used that counts the number of successive pixels that have the characteristics of a dust image that occurs extending in the sub-scanning direction at the same main scanning position. This counter is herein referred to as a string counter. The count value of the string counter increments or decrements for each line. If a pixel with a possibility of having the characteristics of a dust image is detected, regardless of whether it is a real dust image, the string counter increments by one. If, on the other hand, an ambiguous pixel whose status as a dust image cannot be determined from the state of the peripheral pixels is detected, the string counter decrements by one (subtraction).

If the count value of the string counter rises above a threshold value Th, correction is started from that pixel. After the count value of the string counter rises above the threshold value Th, the count value of the string counter may be set to the upper limit value (maximum value).

As described above, according to the present embodiment, even if a break in the dust image has been detected, correction is continuously performed for a predetermined number of lines by assuming that the dust image still continuously extends. With this configuration, the occurrence of a situation in which the dust image is not corrected in each portion where a dust image and an object intersect each other, and a whisker-like dust image is left, is reduced even when read images are sequentially corrected without using a page memory. Accordingly, the accuracy of dust image correction is improved. Dust images generally appear as thin lines and, even if pixels that do not actually belong to a dust image are corrected, it is presumed that the reduction in image quality is extremely small. Also, when read images are sequentially corrected without using a page memory, dust image correction is not performed for a predetermined number of lines until detected as a dust image. However, this happens only in a short region at the beginning of a dust image, and as such, the influence on read images will be small compared to a dust image that appears near an object.

FIG. 4 is a block diagram of the image reading apparatus according to the present embodiment. The CCD line sensor 126 outputs analog electric signals of various colors according to the density of the original image to an A/D conversion circuit 401. The analog electric signals are output line by line or in multiple lines thereof. The A/D conversion circuit 401 converts the analog electric signals of various colors into respective digital image signals (image data), and outputs them to an image processing ASIC 402. The A/D conversion circuit 401 and the image processing ASIC 402 are controlled by a CPU 406.

The image data is input to the image processing ASIC 402, and a shading correction circuit 403 corrects any non-uniformity in the amount of light from the lamp 119. Then, the image data is input to a string detection circuit 404.

The string detection circuit 404 is an example of a detecting unit which detects dust images in accordance with predetermined detection conditions. The string detection circuit 404 includes a line memory, and stores image data corresponding to a single line. Accordingly, the string detection circuit 404 performs dust image detection for each line. The reason for employing the line memory is to reduce the amount of memory necessary while securing the real-time properties of image processing.

An area in which a dust image has been detected by the string detection circuit 404 is corrected by a string correction circuit 405. The string correction circuit 405 is an example of a correcting unit which corrects detected dust images. The string correction circuit 405 (e.g., interpolation processing such as linear interpolation) corrects, for example, a pixel of interest that has been identified as part of a dust image using the pixel value of a pixel(s) located in the periphery of that pixel of interest.

Figure 5:
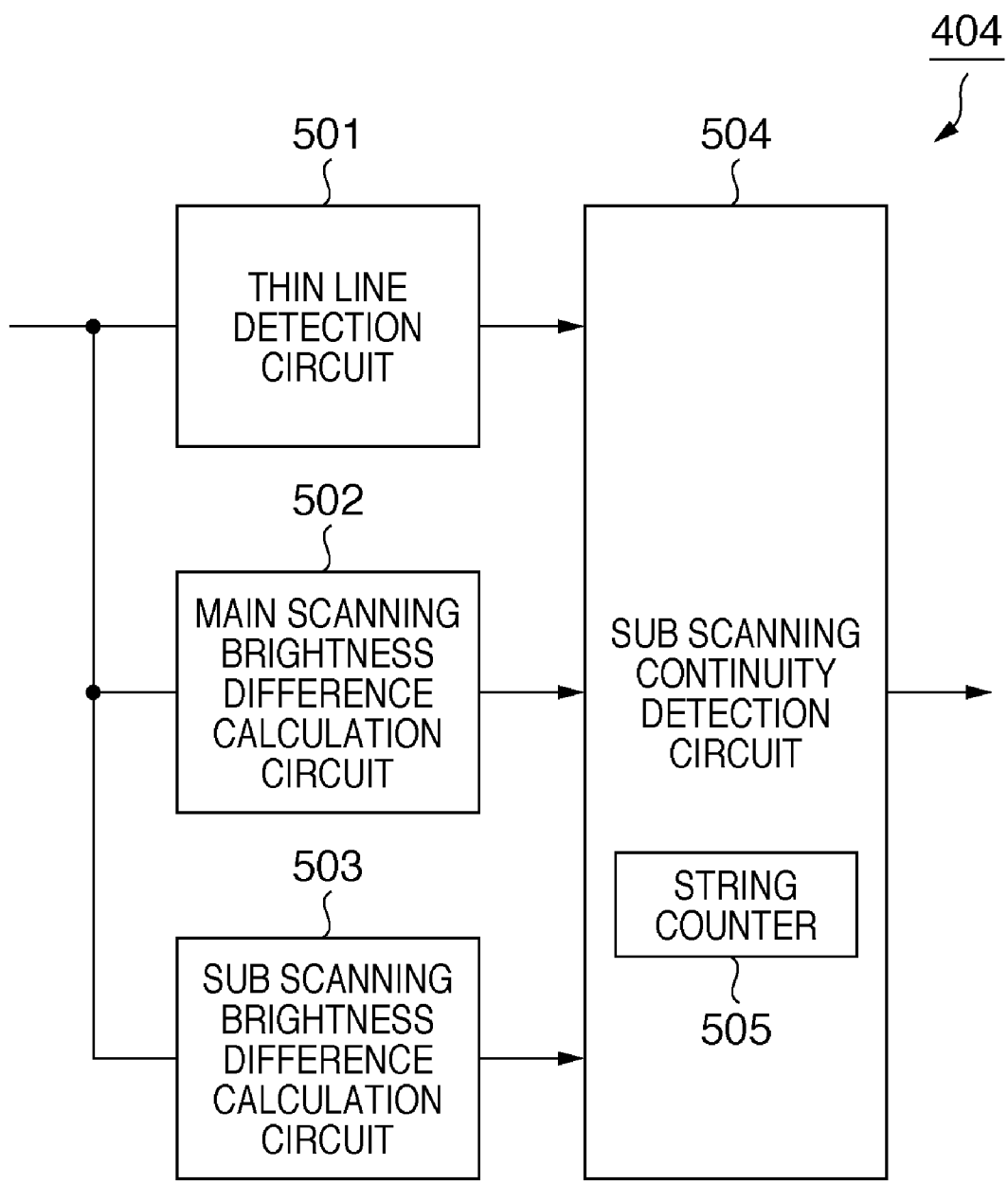
FIG. 5 is a diagram showing a configuration of a string detection circuit according to an embodiment of the present invention.

FIG. 5 is a diagram showing a configuration of the string detection circuit according to the present embodiment. The string detection circuit 404 includes a thin line detection circuit 501 for detecting a thin line, a main scanning brightness difference calculation circuit 502, a sub-scanning brightness difference calculation circuit 503, and a sub-scanning continuity detection circuit 504. As used herein, the main scanning brightness difference refers to the difference in brightness between a pixel of interest and peripheral pixels (e.g., two pixels located above and below) located in the same main scanning position as the pixel of interest. Likewise, the sub-scanning brightness difference refers to the difference in brightness between a pixel of interest and peripheral pixels (e.g., two pixels located on the right and left) located in the same sub-scanning position as the pixel of interest. The sub-scanning continuity detection circuit 504 detects the continuity in the sub-scanning direction of the pixel of interest using a detection result of the thin line detection circuit 501, a calculation result of the main scanning brightness difference calculation circuit 502 and a calculation result of the sub-scanning brightness difference calculation circuit 503. Image data that has been corrected by the shading correction circuit 403 for any influence due to non-uniformity in the amount of light is input into the thin line detection circuit 501, the main scanning brightness difference calculation circuit 502 and the sub-scanning brightness difference calculation circuit 503. The sub-scanning continuity detection circuit 504 includes a string counter 505 that is an example of a counter that counts the number of successive pixels that extend in the sub-scanning direction at the same main scanning position and that satisfy detection conditions.

FIG. 6A is a diagram showing an example of the thin line detection circuit 501 according to the present embodiment. The thin line detection circuit 501 is an example of a thin line detecting unit which detects a thin line included in an image obtained by the reading unit. The string correction circuit 405 corrects an image area in which a thin line has been detected by the thin line detecting unit as an area where a dust image exists.

A light-to-dark edge detection circuit 601 detects a light-to-dark edge where the brightness in the main scanning direction sharply decreases based on input image data. A dark-to-light edge detection circuit 602 detects a dark-to-light edge where the brightness in the main scanning direction of the image data sharply increases. When the light-to-dark edge detection circuit 601 detects a light-to-dark edge, the light-to-dark edge detection circuit 601 outputs a signal indicating that a light-to-dark edge has been detected to a subsequent edge interval detection circuit 603. Likewise, when the dark-to-light edge detection circuit 602 detects a dark-to-light edge, the dark-to-light edge detection circuit 602 outputs a signal indicating that a dark-to-light edge has been detected to the subsequent edge interval detection circuit 603. The light-to-dark edge detection circuit 601 and the dark-to-light edge detection circuit 602 are an example of an edge detecting unit which detects an edge included in an image obtained by the reading unit. The string correction circuit 405 corrects an image area in which an edge has been detected by the edge detecting unit as an area where a dust image exists.

FIG. 6B shows an example of a filter for detecting a light-to-dark edge according to the present embodiment. The present embodiment employs, as a method for detecting a light-to-dark edge, a method in which image data is subjected to a 3×3 filter, and as a result of which a light-to-dark edge is detected. It is desirable that the filter coefficient is set to an optimal value for the conditions of the original. The method in which image data is subjected to a 3×3 filter and, as a result of which, a light-to-dark edge is detected may be used as a method for detecting a dark-to-light edge. In this case as well, it is desirable that the filter coefficient is set to an optimal value for the condition of the original. The filter used to detect a light-to-dark edge and the filter used to detect a dark-to-light edge may be the same or different.

The edge interval detection circuit 603 receives a signal indicating that a light-to-dark edge has been detected from the light-to-dark edge detection circuit 601 and a signal indicating that a dark-to-light edge has been detected from the dark-to-light edge detection circuit 602. The edge interval detection circuit 603 determines whether or not the received signals indicate that the dark-to-light edge and the light-to-dark edge are close to each other in the main scanning direction. If, for example, the interval between the two edges is within five pixels, the edge interval detection circuit 603 determines that the two edges are close to each other. Upon making this determination, the edge interval detection circuit 603 outputs a signal (for example, a 2-bit signal "01") indicating that a thin white line has been detected to a subsequent circuit.

FIG. 6C is a diagram showing an example of image data when a thin white line has been detected and the corresponding pixel level.

If a light-to-dark edge and a dark-to-light edge are close to each other in the main scanning direction (for example, within five pixels), the edge interval detection circuit 603 outputs a signal (for example, a 2-bit signal "10") indicating that a thin black line has been detected to a subsequent circuit.

FIG. 6D is a diagram showing an example of image data when a thin black line has been detected and the corresponding pixel level.

If neither a thin white line nor a thin black line is detected, the edge interval detection circuit 603 outputs a signal (for example, a 2-bit signal "00") indicating that no thin line has been detected to a subsequent circuit.

FIG. 6E is a diagram showing an example of a vertical line detection filter. Such a vertical line detection filter may be used in place of the edge detection filter.

The main scanning brightness difference calculation circuit 502 described with reference to FIG. 5 is a circuit that calculates the difference (main scanning brightness difference) between the brightness of a pixel of interest and that of peripheral pixels located in the same main scanning position (e.g., the average value of two pixels located above and below the pixel of interest). If the brightness difference is above a predetermined value, the main scanning brightness difference calculation circuit 502 outputs a signal (for example, a 1-bit signal "0") indicating that the main scanning brightness difference is above the predetermined value to a subsequent circuit. If, on the other hand, the main scanning brightness difference is not above the predetermined value, the main scanning brightness difference calculation circuit 502 outputs a signal (for example, a 1-bit signal "1") indicating that the main scanning brightness difference is not above the predetermined value to a subsequent circuit.

The line sensor includes imaging sensors arranged in a line in the main scanning direction. Dust images occur as a result of a single imaging sensor continuously reading the same piece of dust. Generally speaking, in a main scanning position in which a dust image exists, the difference in reading level in the sub-scanning direction (main scanning brightness difference) becomes small. Accordingly, if the main scanning brightness difference is relatively small, it is highly probable that a dust image extends in the sub-scanning direction. If, on the other hand, the main scanning brightness difference is relatively large, it is highly probable that a dust image is terminated (a pixel of interest at this time serves as a terminal pixel of the dust image). By focusing on the main scanning brightness difference as described above, it is possible to distinguish a dust image from thin lines in an original.

The sub-scanning brightness difference calculation circuit 503 is a circuit that calculates the difference (sub-scanning brightness difference) between the brightness of a pixel of interest and that of peripheral pixels located in the same sub-scanning position. The brightness of peripheral pixels can be, for example, the average value of sixteen pixels located on the right and left of the pixel of interest. If the sub-scanning brightness difference is above a predetermined value, the sub-scanning brightness difference calculation circuit 503 outputs a signal (for example, a 1-bit signal "0")

indicating that the sub-scanning brightness difference is above the predetermined value to a subsequent circuit. If, on the other hand, the sub-scanning brightness difference is not above the predetermined value, the sub-scanning brightness difference calculation circuit 503 outputs a signal (for example, a 1-bit signal "1") indicating that the sub-scanning brightness difference is not above the predetermined value to a subsequent circuit. As can be understood from the above, the sub-scanning brightness difference calculation circuit 503 is an example of a determining unit which determines, if the difference between the brightness of a pixel of interest and that of peripheral pixels that exist in the periphery of the pixel of interest in the sub-scanning direction is within a predetermined value, whether the pixel of interest is a dust image.

Generally speaking, a dust image occurs as a result of a very fine piece of dust being read. Accordingly, it is rare that the difference in brightness between a piece of dust and the background (a pixel of interest reading the piece of dust and peripheral pixels located in the same main scanning position) becomes a predetermined value or greater. Using this characteristic, it becomes possible to distinguish a dust image from thin lines in the original.

The sub-scanning continuity detection circuit 504 receives a thin line detection signal from the thin line detection circuit 501, a main scanning brightness difference signal from the main scanning brightness difference calculation circuit 502, and a sub-scanning brightness difference signal from the sub-scanning brightness difference calculation circuit 503. The thin line detection signal is a signal indicating that a thin white line has been detected in the image data or that no thin white line has been detected. The main scanning brightness difference signal is a signal indicating that the main scanning brightness difference is above a predetermined value or that the difference is not above the predetermined value. The sub-scanning brightness difference signal is a signal indicating that the sub-scanning brightness difference is above a predetermined value or that the difference is not above the predetermined value.

The sub-scanning continuity detection circuit 504 includes a string counter 505 that corresponds to each main scanning position in order to determine the continuity in the sub-scanning direction of a dust image. The number of string counters 505 is the same as the number of main scanning positions. In the case where dust image detection with a lower accuracy is sufficient, the number of string counters 505 may be smaller than the number of main scanning positions. As can be understood from the above, the string counter 505 is an example of a counter that counts the number of successive pixels that have the characteristics of a dust image that occur extending in the sub-scanning direction at the same main scanning position.

The sub-scanning continuity detection circuit 504 of the present embodiment is an example of a control unit which causes the correcting unit to perform correction for a predetermined number of sub-scanning positions that are located in the same main scanning position as a main scanning position at which the streak has been detected and that exist subsequent to a sub-scanning position at which the streak has been detected, even when no streak is detected. The sub-scanning continuity detection circuit 504 is also an example of a control unit which causes the correcting unit to perform correction assuming that the streak has been detected for a predetermined number of sub-scanning positions that are located in the same main scanning position as a main scanning position at which the streak has been detected and that exist subsequent to a sub-scanning position at which the streak has been detected. As described above, the technical concept of the present invention is characterized by performing correction for subsequent sub-scanning positions when a dust image is detected. There are two methods for this: A method in which sub-scanning positions where a dust image has not been detected are added as a target of correction assuming that a dust image has been detected in the sub-scanning positions; and a method in which a detection result where no dust image has been detected in the sub-scanning positions is replaced by an assumption that a dust image has been detected.

Figure 7:
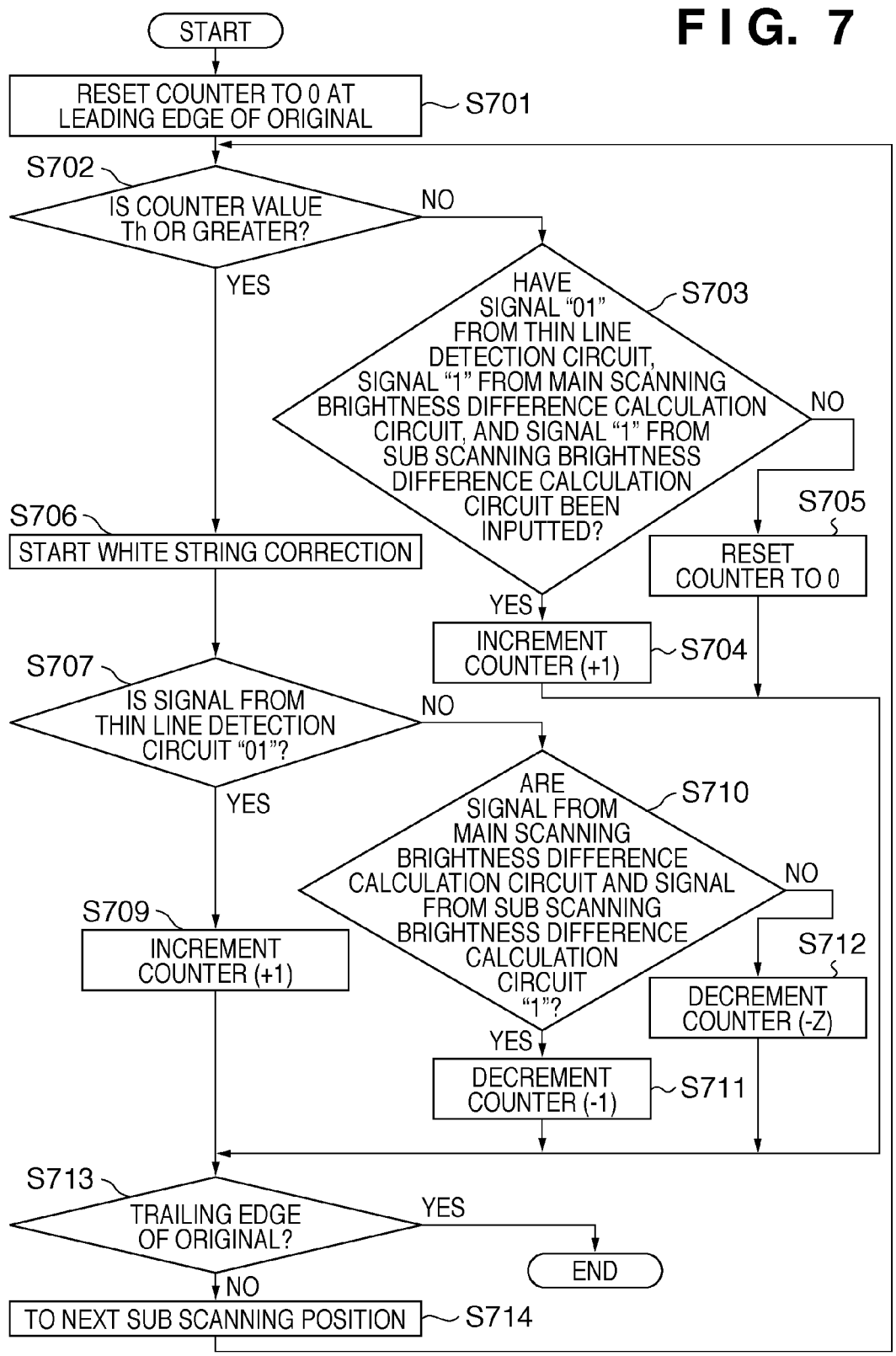
FIG. 7 is a flowchart illustrating an example of an operation for detecting a white dust image performed by a sub-scanning continuity detection circuit, according to an embodiment of the present invention.

FIG. 7 is a flowchart illustrating an example of an operation for detecting a white dust image performed by the sub-scanning continuity detection circuit according to the present embodiment. In step S701, the sub-scanning continuity detection circuit 504 resets all string counters 505 to 0 at the leading edge of the original. This is so as to perform detection independently for each sheet of the original.

In step S702, the sub-scanning continuity detection circuit 504 determines whether or not the count value of a string counter is not less than a threshold value Th. This predetermined threshold value Th is a value (e.g., 32) that is theoretically or empirically set to detect a dust image. If the count value of the string counter is the threshold value Th or greater, it can be assumed that a dust image has occurred in the main scanning position corresponding to this string counter. Conversely, if the count value of the string counter is less than the threshold value Th, it can be assumed that there is no dust image in the main scanning position corresponding to this string counter. When the count value of the string counter is less than the predetermined threshold value Th, the procedure advances to step S703.

In step S703, the sub-scanning continuity detection circuit 504 determines whether to increment or reset the string counter corresponding to the main scanning position of a pixel of interest. If, for example, a signal "01" indicating that a thin white line has been detected in the image data, a signal "1" indicating that the main scanning brightness difference is not above the predetermined value, and a signal "1" indicating that the sub-scanning brightness difference is not above the predetermined value are input, the sub-scanning continuity detection circuit 504 determines that the counter should be incremented. In this case, the procedure advances to step S704. If, on the other hand, any one of these three signals is not input, the sub-scanning continuity detection circuit 504 determines that the count value should be reset to zero. In this case, the procedure advances to step S705.

In S704, the sub-scanning continuity detection circuit 504 increments the count value of the corresponding string counter by one. Then, the procedure advances to step S713.

In step S705, the sub-scanning continuity detection circuit 504 resets the count value of the corresponding string counter to zero. Then, the procedure advances to step S713.

If it is determined in step S702 that the count value of the string counter is the threshold value Th or greater, the procedure advances to step S706. In step S706, the sub-scanning continuity detection circuit 504 determines that the pixel of interest is a white dust image, and outputs a signal indicating that a dust image has been detected to the string correction circuit 405. This signal corresponds to a correction start signal. Upon receiving the correction start signal, the string correction circuit 405 performs correction continuously until a correction stop signal is output. The correction stop signal is outputted in step S702 from the sub-scanning continuity detection circuit 504 to the string correction circuit 405 if the count value becomes smaller than the threshold value Th. In the manner described above, the string correction circuit 405 corrects the pixel of the main scanning position whose count value is above a predetermined threshold value.

The correction start signal may include an instruction to start correction and information regarding the main scanning position to be corrected. The information regarding the main scanning position to be corrected may be transmitted to the string correction circuit 405 by other methods. However, once a dust image is detected (when the count value of the string counter is above the predetermined threshold value Th), the calculation conditions of the string counter 505 are changed as follows.

In step S707, the sub-scanning continuity detection circuit 504 determines whether or not the thin line detection signal indicates that a thin white line has been detected. If the thin line detection signal is "01", because it indicates that a white line has been detected, the procedure advances to step S709. In step S709, the sub-scanning continuity detection circuit 504 increments the count value of the string counter 505 by one. Then, the procedure advances to step S713.

If, on the other hand, no thin white line has been detected, the procedure advances to step S710. Here, if a thin line is no longer detected, after a dust image is once detected; it indicates that a terminal pixel that forms the end of the dust image has been specified. That is, the sub-scanning continuity detection circuit 504 is an example of a specifying unit which specifies a terminal pixel that forms the end of a dust image in accordance with the value of at least one peripheral pixel that is located in the periphery of a pixel of interest.

In step S710, the sub-scanning continuity detection circuit 504 determines whether or not the main scanning brightness difference and the sub-scanning brightness difference are not above the predetermined value. For example, if the main scanning brightness difference signal is "1", it indicates that the main scanning brightness difference is not above the predetermined value. Likewise, if the sub-scanning brightness difference signal is "1", it indicates that the sub-scanning brightness difference is not above the predetermined value. If both signals are 1 as above, the procedure advances to step S711.

In step S711, the sub-scanning continuity detection circuit 504 subtracts (decrements) one from the count value of the string counter. Then, the procedure advances to step S713. The sub-scanning continuity detection circuit 504 is an example of a subtracting unit which subtracts one from the count value of a counter when a pixel that does not satisfy the detection conditions is detected.

In the present embodiment, even if a terminal pixel is detected, correction is continuously performed for a predetermined number of lines assuming that the dust image still continuously extends. Accordingly, the count value of the string counter 505 is decremented by one rather than resetting it to zero. This means that ambiguous pixels whose status as dust images cannot be determined are added as a target of correction. Accordingly, the sub-scanning continuity detection circuit 504 is an example of an adding unit which adds, as a target of correction by the correcting unit, a predetermined number of pixels that belong to the same main scanning position as the main scanning position of a terminal pixel and that extend from the terminal pixel in the sub-scanning direction as part of a dust image.

If, on the other hand, either of the main scanning brightness difference signal and the sub-scanning brightness difference signal is 0, the procedure advances to step S712. In step S712, the sub-scanning continuity detection circuit 504 subtracts a preset subtraction value Z from the count value of the string counter. Then, the procedure advances to step S713. As this subtraction value Z becomes smaller, it becomes easier to suppress failures of dust image detection due to changes in the background. However, even when there is actually no dust image, a dust image can be erroneously detected. Accordingly, it is desirable that the subtraction value Z is set to an empirically appropriate value (e.g., 4).

In step S713, the sub-scanning continuity detection circuit 504 determines whether or not the line currently scanned is the trailing edge of the original (whether or not the current sub-scanning position is the final sub-scanning position). If the line currently scanned is the trailing edge of the original, this process ends. If, on the other hand, the line currently scanned is not the trailing edge of the original, the procedure advances to step S714. In step S714, the sub-scanning continuity detection circuit 504 changes the target of correction to the next sub-scanning position, and the procedure returns to S702. After that, the process spanning from step S702 to S713 is repeated.

Figure 8:
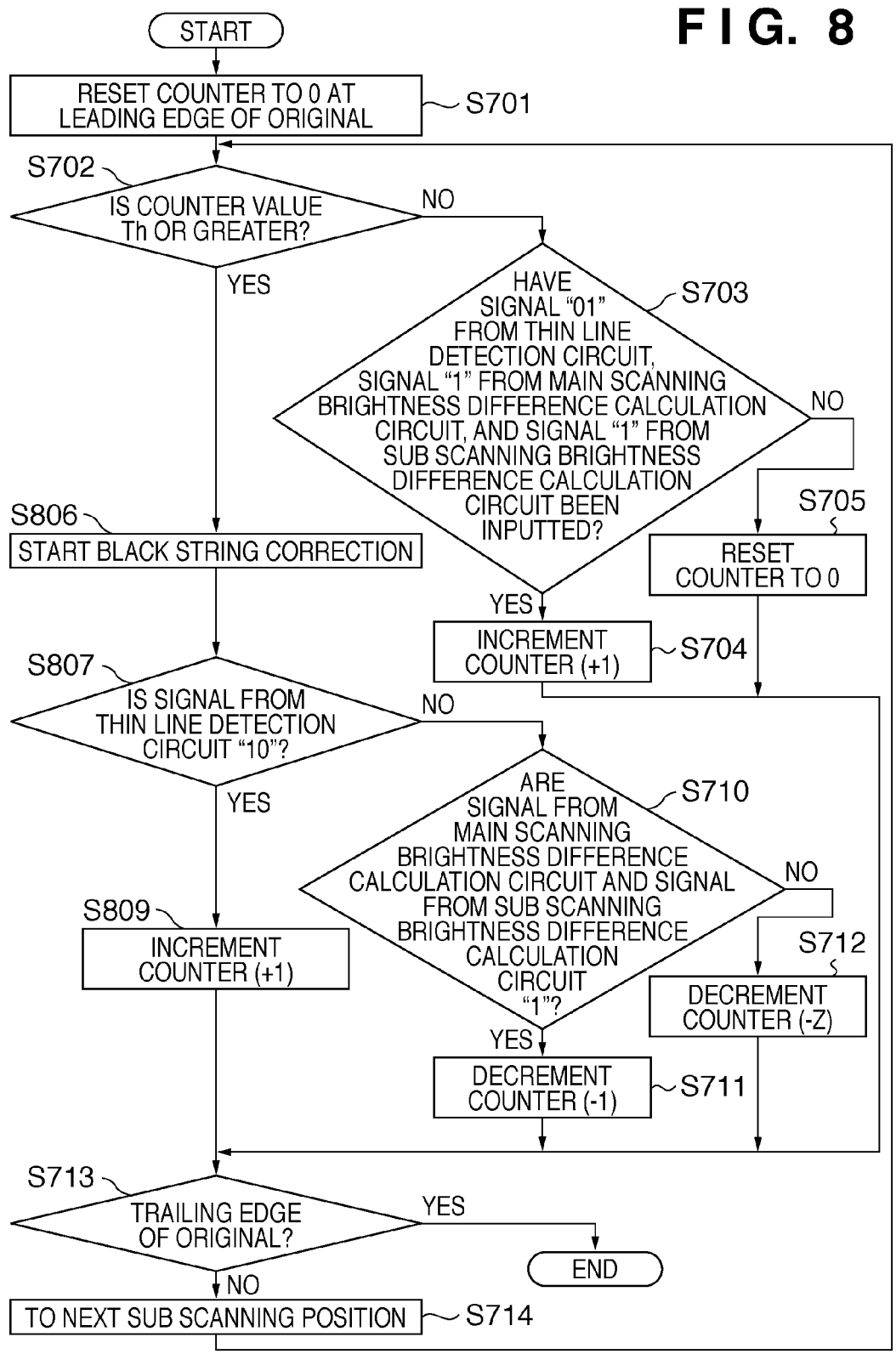
FIG. 8 is a flowchart illustrating an example of an operation for detecting a black dust image, according to an embodiment of the present invention.

FIG. 8 is a flowchart illustrating an example of an operation for detecting a black dust image according to the present embodiment. The same reference numerals are assigned to the steps already described in FIG. 7. In FIG. 8, the step S706 of FIG. 7 is replaced by step S806, and step S707 is replaced by step S807. In step S702, if it is determined that the count value of the string counter is the threshold value Th or greater, the procedure advances to step S806.

In step S806, the sub-scanning continuity detection circuit 504 determines that the pixel of interest is a black dust image, and outputs a signal indicating that a black dust image has been detected to the string correction circuit 405. This signal corresponds to a correction start signal. The correction start signal may include an instruction to start correction and information regarding the main scanning position to be corrected.

In step S807, the sub-scanning continuity detection circuit 504 determines whether or not the thin line detection signal indicates that a thin black line has been detected. If the thin line detection signal is "10", because it indicates that a thin black line has been detected, the procedure advances to step S809. If, on the other hand, the thin line detection signal is not "10", because it indicates that no thin black line has been detected, the procedure advances to step S710.

The present embodiment is characterized by switching count control of the string counter depending on when a dust image is detected once in the same original and in the same main scanning position, and when no dust image is detected in the same original and in the same main scanning position. Because the dust image detection conditions of the former are eased compared to the dust image detection conditions of the latter, even if there is a change in the background, dust image correction can be performed continuously. Consequently, the accuracy of dust image correction is improved. That is, even when a terminal pixel that seems to be the end of a dust image is detected, by adding peripheral pixels that exist subsequent to that terminal pixel as a target of correction, the accuracy of dust image correction is improved.

Also, according to the present embodiment, the number of pixels that belong to a dust image is counted using a string counter, when the count value rises above a threshold value, correction is started, whereas when an ambiguous pixel whose status as a dust image cannot be determined is detected, subtraction is performed from the count value. With this configuration, dust image correction can be performed continuously and the accuracy of dust image correction is improved.

According to the present embodiment, even when the original is a document or a natural image such as a picture, the accuracy of dust image correction can be improved. The present embodiment and an embodiment described below are applicable not only to a monochrome original but also to a color original. When the image data of a color original is expressed in multiple color components (e.g., RGB), the above-described dust image detection method is applied to each color component. When a dust image is detected in any one of the color components, string correction is applied to that color component. However, the string correction may be executed for other color components from which a dust image was not detected. The reason for this is because even those color components those are barely determined as not satisfying the dust image detection conditions partially include a dust image, and so it is worthwhile to apply string correction. In addition, because the string correction is an interpolation process that uses adjacent pixels and the like, even when the string correction is applied to color components with no dust image, the reduction in image quality is very little.

Embodiment 2

The present embodiment attempts to continuously perform dust image correction by automatically setting the count value to an upper limit value when the count value is the threshold value Th or greater as described in FIGS. 3A and 3B.

Figure 9:
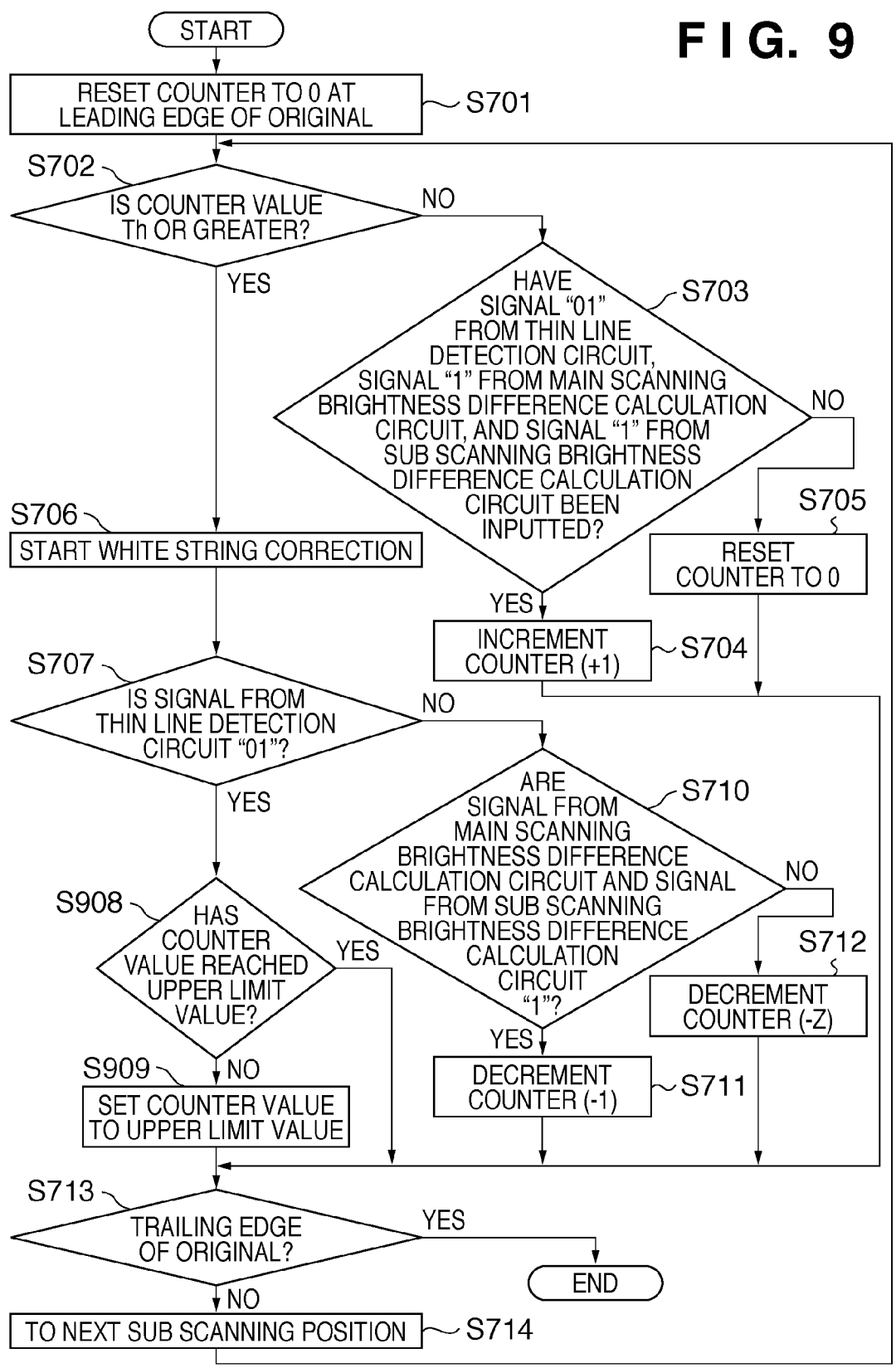
FIG. 9 is a flowchart illustrating another example of an operation for detecting a white dust image performed by a sub-scanning continuity detection circuit, according to an embodiment of the present invention.

FIG. 9 is a flowchart illustrating another example of an operation for detecting a white dust image performed by the sub-scanning continuity detection circuit according to the present embodiment. The steps already described are given the same reference numerals so as to simplify the description. As can be seen from a comparison of FIG. 9 with FIG. 7, the step S709 is replaced by steps S908 and S909. In step S707, if the thin line detection signal is "01", the procedure advances to step S908.

In step S908, the sub-scanning continuity detection circuit 504 determines whether or not the string count value has reached an upper limit value. If the string count value has reached the upper limit value, the procedure advances to step S713. If, on the other hand, the string count value has not reached the upper limit value, the procedure advances to step S909.

In step S909, the sub-scanning continuity detection circuit 504 sets the count value of the string counter 505 corresponding to the main scanning position at which a white dust image has been detected to an upper limit value. Then, the procedure advances to step S713. As can be understood from the above, the sub-scanning continuity detection circuit 504 is an example of a setting unit which sets the count value to an upper limit value of the counter when the count value rises above a predetermined threshold value.

Figure 10:
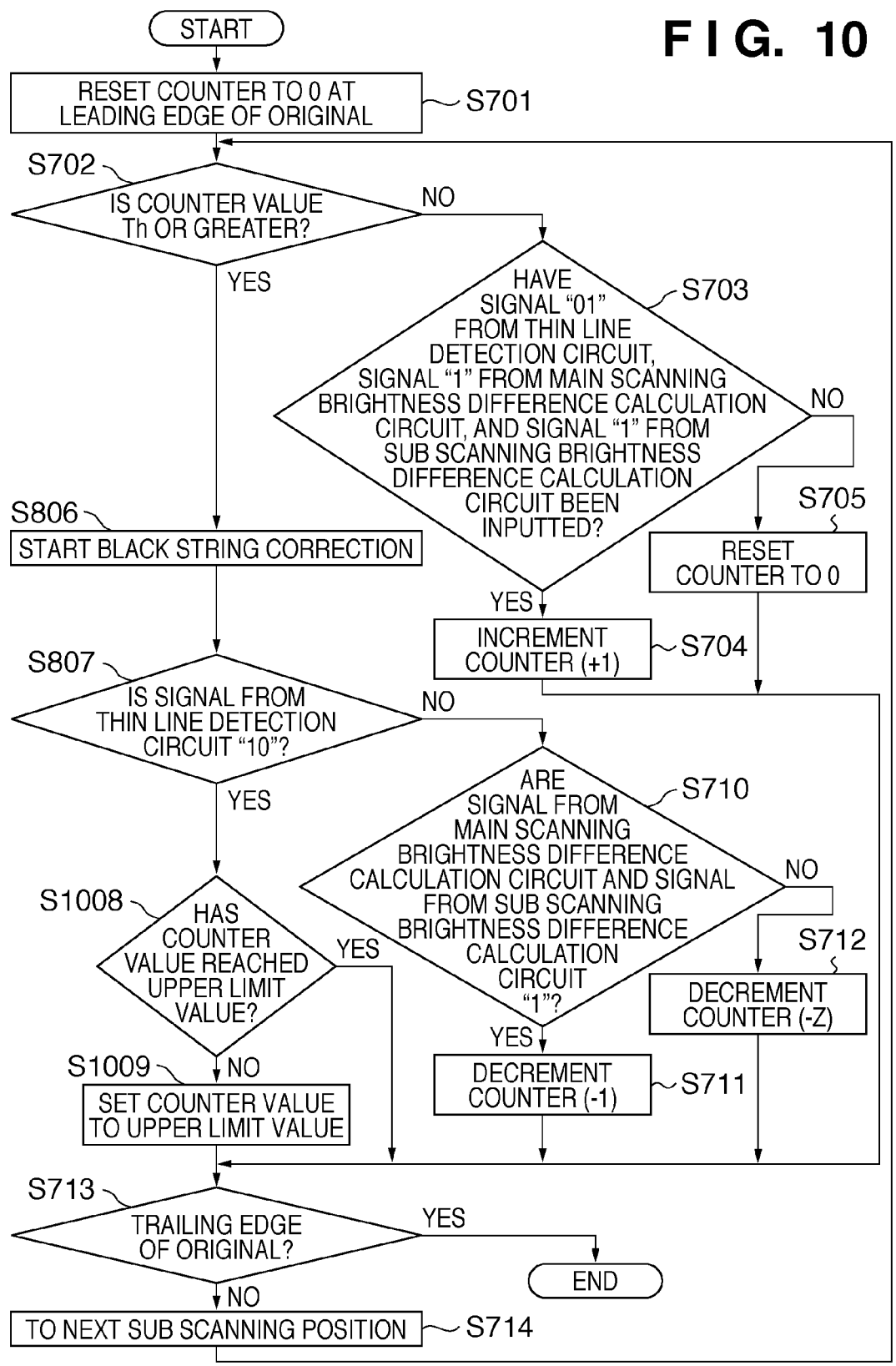
FIG. 10 is a flowchart showing another example of an operation for detecting a black dust image performed by a sub-scanning continuity detection circuit, according to an embodiment of the present invention.
Figure 11:
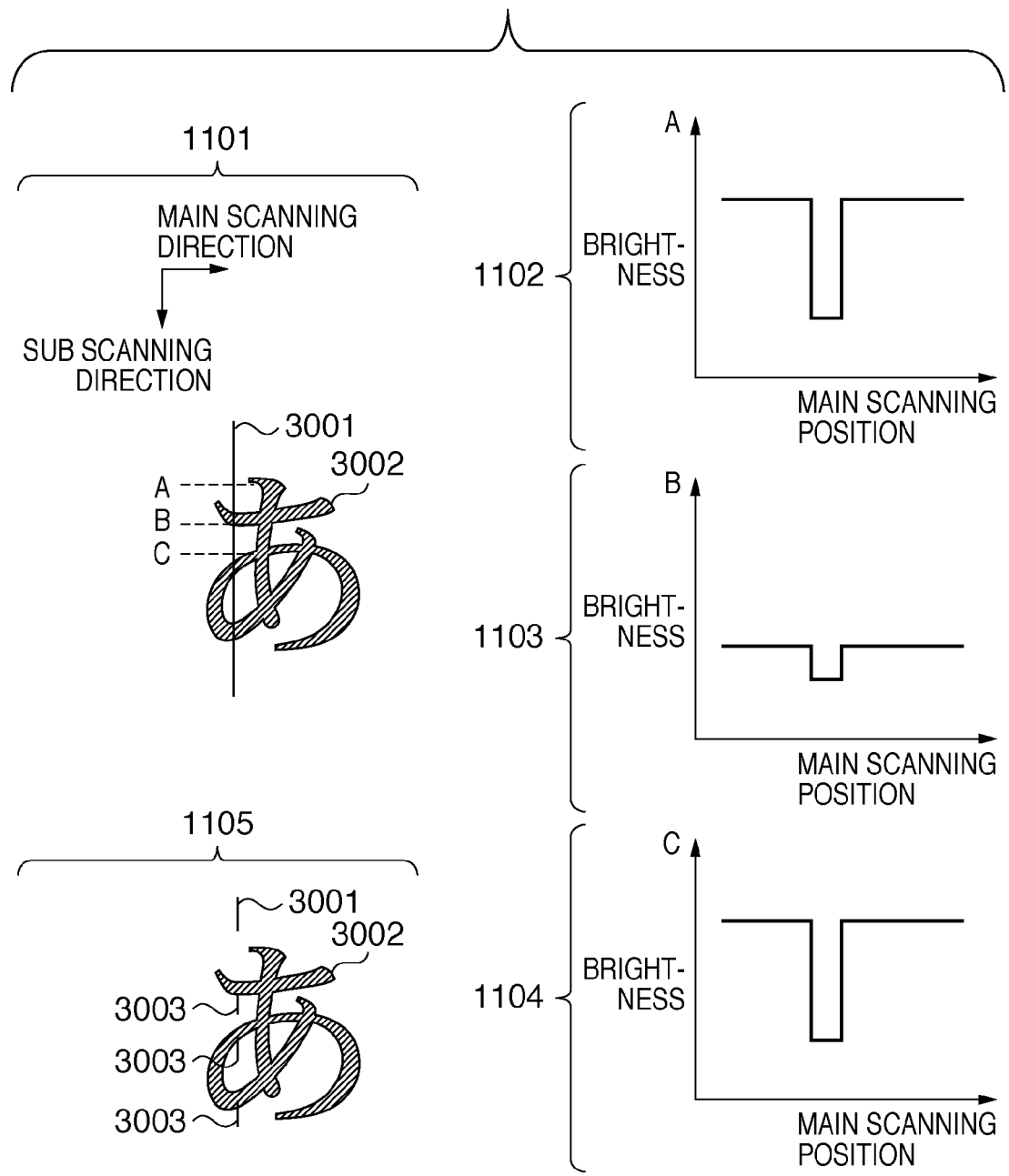
FIG. 11 is a diagram illustrating an example of string detection according to the related art.

FIG. 10 is a flowchart illustrating another example of an operation for detecting a black dust image performed by the sub-scanning continuity detection circuit according to the present embodiment. The steps already described are given the same reference numerals so as to simplify the description. As can be seen from a comparison of FIG. 10 with FIG. 8, the step S809 is replaced by steps S1008 and S1009. In step S707, if the thin line detection signal is "10", the procedure advances to step S1008.

In step S1008, the sub-scanning continuity detection circuit 504 determines whether or not the string count value has reached an upper limit value. If the string count value has reached the upper limit value, the procedure advances to step S713. If, on the other hand, the string count value has not reached the upper limit value, the procedure advances to step S1009. In step S1009, the sub-scanning continuity detection circuit 504 sets the count value of the string counter 505 corresponding to the main scanning position at which a black dust image has been detected to an upper limit value. Then, the procedure advances to step S713.

According to Embodiment 2, the count value of the string counter is set to its upper limit value if the count value rises above a predetermined threshold value; thereby, the string correction can be performed continuously. That is, effects similar to Embodiment 1 can be obtained in Embodiment 2 as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-079217, filed on Mar. 25, 2008, which is hereby incorporated by reference herein in its entirety.

What is claimed is:

1. An image reading apparatus comprising:
a feeding unit which feeds an original to an original image reading position;
a reading unit which reads the original fed by the feeding unit in a feeding direction, at the original image reading position;
a counter which counts the number of successive streak candidate pixels that extend in the feeding direction;
a subtracting unit which subtracts a predetermined value from the count value of the counter when a pixel of interest is not a streak candidate pixel; and
a correcting unit which corrects the pixel of interest in which the count value is above a predetermined threshold value.

2. The image reading apparatus according to claim 1, wherein the counting unit sets the count value to an upper limit value of the counter when the count value rises above the predetermined threshold value.

3. The image reading apparatus according to claim 1, further comprising:
a specifying unit which specifies a terminal pixel that forms the end of the streak according to the value of at least one peripheral pixel that is located in the periphery of the pixel of interest; and
an adding unit which adds, to a target of correction by the correcting unit, a predetermined number of pixels of which a main scanning position belongs to a main scanning position of the terminal pixel and that extend from the terminal pixel in the sub-scanning direction as part of the streak.

4. The image reading apparatus according to claim 1, further comprising:
an edge detecting unit which detects an edge included in an image obtained by the reading unit;
wherein the correcting unit corrects an image area in which the edge has been detected by the edge detecting unit as an area where a streak exists.

5. The image reading apparatus according to claim 1, further comprising a thin line detecting unit which detects a thin line included in an image obtained by the reading unit;
wherein the correcting unit corrects an image area in which a thin line has been detected by the thin line detecting unit as an area where a streak exists.

6. The image reading apparatus according to claim 4, further comprising a determining unit which determines the pixel of interest as a streak when the difference between the brightness of the pixel of interest and the brightness of a peripheral pixel that exists in the periphery of the pixel of interest in the feeding direction is within a predetermined value.

7. A method for controlling an image reading apparatus comprising the steps of:
- feeding an original to an original image reading position;
- reading the original fed by the feeding unit in a feeding direction, at the original image reading position;
- counting the number of successive streak candidate pixels that extend in the feeding direction;
- subtracting a predetermined value from the count value when a pixel of interest is not a streak candidate; and
- correcting the pixel of interest in which the count value is above a predetermined threshold value.

8. An image reading apparatus comprising:
- a feeding unit which feeds an original to a reading position;
- a reading unit which reads the original fed by the feeding unit in a feeding direction, at the reading position;
- a streak detecting unit which determines whether a pixel of interest is or is not a streak candidate according to condition for detecting a streak in the feeding direction;
- a continuity detection unit which detects continuity of the streak candidate in the feeding direction;
- a streak correcting unit which performs a streak correction; and
- a control unit which in response to a determination that the pixel of interest is a streak candidate and a detection that the continuity of the streak candidate does not meet a predetermined condition, controls the streak correcting unit not to perform the streak correction, and which in response to a determination that the pixel of interest is not a streak candidate and a detection that the continuity of the streak candidate meets the predetermined condition, controls the streak correcting unit to perform the streak correction.

9. The image reading apparatus according to claim 8, wherein the continuity detection unit comprises:
- a counter which counts a number of the streak candidate at each position in a reading direction perpendicular to the feeding direction,
- wherein the counter counts such that:
  - responsive to a determination that the pixel of interest is a streak candidate, the counter adds a first value to a count value corresponding to a position of pixel of interest in the reading direction, and
  - responsive to a determination that the pixel of interest is not a streak candidate, the counter subtracts a second value from the count value corresponding to a position of pixel of interest in the reading direction.

10. The image reading apparatus according to claim 9, wherein the continuity detection unit determines whether or not the count values is larger than a threshold.

11. The image reading apparatus according to claim 8, wherein the streak detecting unit includes:
- an edge detection unit;
- a first brightness difference calculating unit which calculates a brightness difference between the pixel of interest and an adjacent pixel neighboring to the pixel of interest in the reading direction; and
- a second brightness difference calculating unit which calculates a brightness difference between the pixel of interest and an adjacent pixel neighboring to the pixel of interest in the feeding direction.

12. The image reading apparatus according to claim 8, wherein the steak correcting unit corrects a pixel value of the pixel of interest using a pixel value of the adjacent pixel.

13. The image reading apparatus according to claim 8, wherein the continuity detection unit comprises:
- a counter which counts a number of streak candidates at each position in a reading direction perpendicular to the feeding direction, wherein the counter increases the count of streak candidates when the streak detecting unit detects that the pixel of interest is a streak candidate, and wherein the counter decreases the count of streak candidates when the streak detecting unit detects that the pixel of interest is not a streak candidate, and
- wherein the control unit controls the streak correction of the pixel of interest based on the count of streak candidates counted by the counter corresponding to the pixel of interest.

* * * * *